United States Patent [19]

Horiuchi et al.

[11] 4,345,190
[45] Aug. 17, 1982

[54] CHOPPER CONTROL SYSTEM

[75] Inventors: Michimasa Horiuchi, Mito; Masahiko Ibamoto; Hideaki Rokutan, both of Katsuta, all of Japan

[73] Assignee: Hitachi, Ltd., Tokyo, Japan

[21] Appl. No.: 85,974

[22] Filed: Oct. 18, 1979

[30] Foreign Application Priority Data

Oct. 21, 1978 [JP] Japan ............................... 53-129052

[51] Int. Cl.³ ............................................ H02P 5/06
[52] U.S. Cl. ................................... 318/338; 318/341; 318/332
[58] Field of Search ............... 318/138, 338, 341, 332; 363/124

[56] References Cited

U.S. PATENT DOCUMENTS

| | | | |
|---|---|---|---|
| 3,500,161 | 3/1970 | Domann et al. | 318/139 |
| 4,032,833 | 6/1977 | Ibamoto et al. | 363/124 |
| 4,163,191 | 7/1979 | Kiwaki et al. | 318/139 |
| 4,171,506 | 10/1979 | Horiuchi et al. | 318/338 |
| 4,171,510 | 10/1979 | Kiwaki et al. | 318/139 |
| 4,171,532 | 10/1979 | Sloan et al. | 363/124 |
| 4,211,965 | 7/1980 | Toyama et al. | 318/139 |
| 4,217,527 | 8/1980 | Bourke et al. | 318/139 |

Primary Examiner—Gene Z. Rubinson
Attorney, Agent, or Firm—Craig and Antonelli

[57] ABSTRACT

A thyristor chopper whose gate signal is controlled by a magnetic phase shifter is connected between a battery and a series motor of an electric vehicle and is short-circuited by a bypass contactor as soon as the duty factor of the chopper attains 100%. In the short-circuited condition of the chopper, the magnetic phase shifter remains idle and does not participate in the control operation although the instruction current and the actual motor current are kept applied to its control windings. Therefore, the level of the output from the magnetic phase shifter is indicative of the value of the actual motor current when the instruction current value is fixed, so that the actual motor current value can be detected by detecting the output level from the magnetic phase shifter. When the actual motor current value is detected to be excessively large, the bypass contactor short-circuiting the chopper is released to decrease the value of the motor current, while when the actual motor current value is detected to be excessively small, a field-weakening contactor is closed to connect a field-weakening resistor in parallel with the field winding of the series motor so as to accelerate the motor by the field-weakening control.

6 Claims, 6 Drawing Figures

CHOPPER CONTROL SYSTEM

FIELD OF THE INVENTION

This invention relates to a chopper control system, and more particularly to a system of the kind above described in which a magnetic phase shifter is used for the gate control of a semiconductor chopper.

BACKGROUND OF THE INVENTION

A magnetic phase shifter has, in spite of its simple construction, such an advantage that it can compare a plurality of control inputs in a relation insulated from one another and can convert the result of comparison into an amplified phase-shifted output having a considerably well shaped waveform. Also, the magnetic phase shifter has such other advantages that its time constant can be suitably adjusted, and its operation is hardly affected by noise. Therefore, a chopper control system, which is simple in construction and can operate with high reliability, can be realized when a magnetic phase shifter is used for the gate control of a semiconductor chopper such as a thyristor chopper.

In an electric vehicle or the like driven by a DC motor controlled by a semiconductor chopper, an instruction signal for the current value to be supplied to the DC motor is produced according to the amount of depression of the accelerator pedal, and applied to a current control system in the vehicle which includes generally a feedback path for the negative feedback of the actual value of the motor current. More particularly, when a magnetic phase shifter is used for the gate control of the chopper, the motor current instruction signal is applied to its first control winding, and the actual motor current signal is applied to its second control winding, so that the duty factor of the chopper can be adjusted depending on the difference between the magnetomotive forces induced by these signals in the first and second control windings of the magnetic phase shifter.

In such a chopper control system, various modes of control based on the load current signal are also frequently required other than the above mode of current control. For example, when the duty factor of the chopper attains 100%, the chopper is short-circuited through a bypass contactor for preventing an excessive rise in the temperature of the thyristor or like semiconductor element in the chopper. Under such a condition, however, if the electric vehicle were subjected to a great decrease in the motor speed in order, for example, to ascend a slope way or get away from an unexpected pit, the motor current would increase greatly, resulting in damage of the motor by burning due to excess temperature rise. To avoid the above trouble, the bypass contactor should be released as soon as the motor current value increases up to a predetermined setting. For this purpose, it is required to detect the actual value of the motor current. Also, when the electric vehicle running under a light-loaded condition is to be driven at a higher speed, a control mode called field-weakening control similar to that applied to electric railway vehicles should take place upon detection of the decrease in the motor current value.

However, it is not so simple to detect actually the value of the motor current. This is because the control circuit is frequently required to be isolated or insulated from the main circuit, and elements including a DC transformer and an overcurrent relay are additionally required for the current detection purpose, resulting in an uneconomical control system. Especially, in the case of an electric vehicle or a vehicle such as a battery-driven forklift truck, the additional provision of the elements above described is economically very difficult and is also undesirable from the viewpoint of the available space.

SUMMARY OF THE INVENTION

It is therefore a primary object of the present invention to obviate the prior art defects pointed out above and to provide a novel and improved chopper control system in which a few inexpensive elements of simple construction are merely additionally provided so as to detect the motor current value for the purpose of releasing the short-circuit means such as the bypass contactor or for the purpose of the field-weakening control.

The chopper control system according to the present invention which attains the above object is featured by the fact that a level detector detects the level of the output from the magnetic phase shifter while the short-circuit means such as the bypass contactor is in operation, so that various modes of control including the release of the short-circuit means and the field-weakening control, other than the control mode for the gate control of the chopper, can be carried out depending on the detected level of the output from the magnetic phase shifter.

In other words, both the chopper and the magnetic phase shifter do not participate in the control operation and remain idle during the period of time in which the bypass contactor is kept energized to short-circuit the chopper. The magnetic phase shifter is associated with the feedback network for the negative feedback of the load current which is, for example, the motor current, and it has also the function of insulating the output network from the networks including the feedback network. Therefore, when the load current instruction signal applied to the magnetic phase shifter is fixed at a selected value or maintained constant, its output should have the level corresponding to the actual value of the load current which is, for example, the motor current. The present invention is based on a unique utilization of the above relationship, and in the present invention, the load current is detected by the magnetic phase shifter, which remains idle in the energized condition of the bypass contactor, so as to carry out the control modes other than the control mode for the gate control of the chopper.

BRIEF DESCRIPTION OF THE DRAWINGS

The above and other objects, features and advantages of the present invention will be apparent from the following detailed description of preferred embodiments thereof taken in conjunction with the accompanying drawings, in which.

DETAILED DESCRIPTION OF THE INVENTION

Preferred embodiments of the chopper control system according to the present invention will now be described in detail with reference to the drawings.

Figure 1:
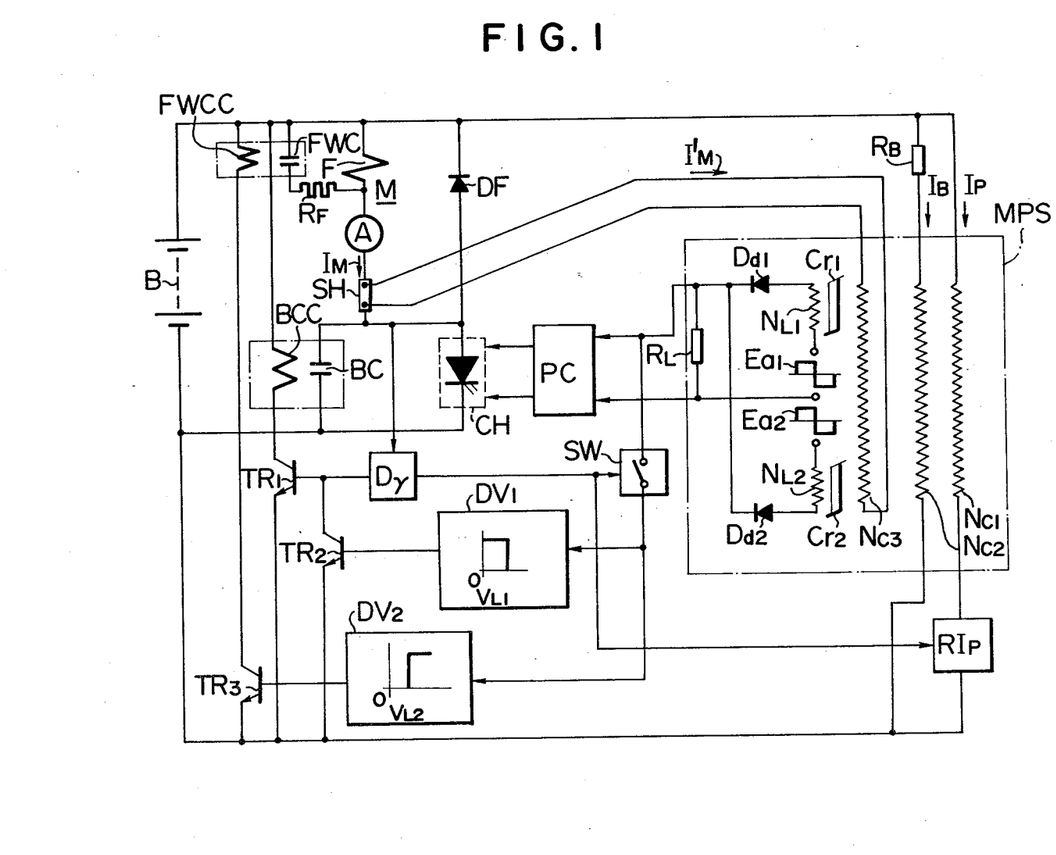
FIG. 1 is an electrical circuit diagram of a preferred embodiment of the chopper control system according to the present invention.

In a preferred embodiment of the chopper control system according to the present invention shown in FIG. 1, a thyristor chopper CH controls the current IM of a DC motor M supplied with electric power from a battery B for driving an electric vehicle.

Referring to FIG. 1, the armature A of the motor M, the field winding F of the motor M, a shunt element SH and the chopper CH are connected in series with the battery B. A free-wheel diode $D_F$ is connected in parallel with the series circuit composed of the armature A, the field winding F and the shunt element SH, and a bypass contactor BC is connected in parallel with the chopper CH to bypass the current flowing through the chopper CH. This chopper CH has such a switching function that it is closed in response to the application of an "on" signal to its gate, and it is opened in response to the application of an "off" signal to its gate. Therefore, the chopper CH permits intermittent application of the DC power supply voltage to the motor M when it is connected between the battery B and the motor M as shown in FIG. 1. Thus, the mean value of the voltage applied to the motor M, hence, the mean value of the current supplied to the motor M can be controlled as desired by adjusting the proportion of the "on" period in one operation cycle (which proportion is commonly called the duty factor) of the chopper CH. On the other hand, in the closed condition of the bypass contactor BC, the full power supply voltage of the battery B is applied to the motor M independently of the current control by the chopper CH, and the value of the motor current $I_M$ is determined by the loaded condition of the motor M.

A magnetic phase shifter MPS controls the chopper CH. In the magnetic phase shifter MPS, the value $I_M'$ of the motor current $I_M$ detected by the shunt element SH is compared with the value of an instruction current $I_P$ so as to control the duty factor of the chopper CH depending on the error therebetween. This magnetic phase shifter MPS includes a pair of cores $C_{r1}$ and $C_{r2}$ each exhibiting a square magnetic characteristic, a pair of output windings $N_{L1}$ and $N_{L2}$ wound around the respective cores $C_{r1}$ and $C_{r2}$, and three associated control windings $N_{C1}$, $N_{C2}$ and $N_{C3}$. The output windings $N_{L1}$ and $N_{L2}$ are energized by respective AC power sources $E_{a1}$ and $E_{a2}$ each generating a rectangular waveform, and the output signals from these output windings $N_{L1}$ and $N_{L2}$ pass through feedback rectifiers $D_{d1}$ and $D_{d2}$ respectively to be applied across a load resistor $R_L$.

Figure 2A:
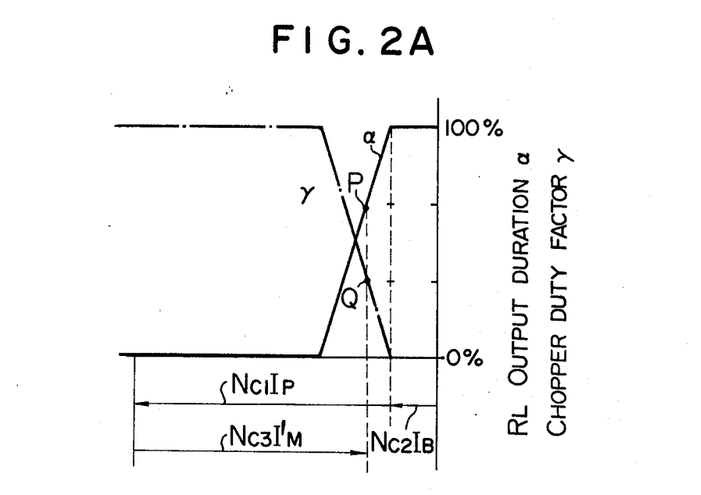
FIGS. 2A and 2B illustrate the operation of the magnetic phase shifter and the chopper in the chopper control system shown in FIG. 1.

Such a magnetic phase shifter MPS is similar in construction to a known magnetic amplifier of the middle-tapped doubler type, and the duration $\alpha$ of the output voltage appearing across the load resistor $R_L$ in response to the application of control inputs to the control windings $N_{C1}$, $N_{C2}$ and $N_{C3}$ varies in a manner as shown in FIG. 2A. The symbol $N_{C2}I_B$ in FIG. 2A designates a bias magnetomotive force which provides a maximum value of the duration $\alpha$ when a bias current $I_B$ is supplied to the control winding $N_{C2}$ without applying any control inputs to the remaining control windings $N_{C1}$ and $N_{C3}$.

Figure 2B:
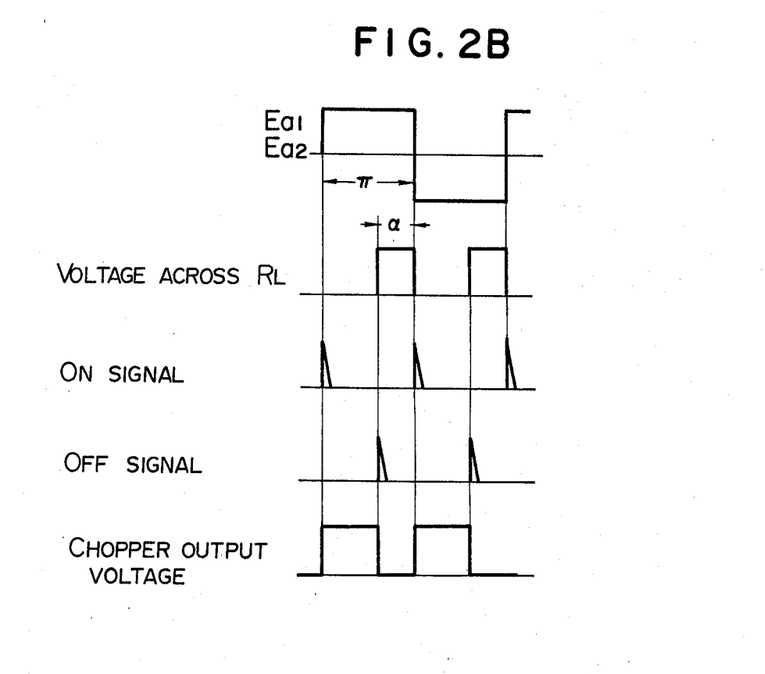

A pulse signal appears from a pulse converter PC in FIG. 1 in synchronism with the polarity inversion points of the rectangular waveforms generated from the AC power sources $E_{a1}$ and $E_{a2}$. More precisely, an "on" signal as shown in FIG. 2B appears from the pulse converter PC in synchronism with the fall time of the voltage appearing across the load resistor $R_L$, and an "off" signal as shown in FIG. 2B appears from the pulse converter PC in synchronism with the rise time of the voltage appearing across the load resistor $R_L$. The "on" signal and "off" signal thus obtained are applied to the chopper CH to turn on and off the chopper CH. During the period of time $(\pi-\alpha)$ in FIG. 2B, the chopper CH is kept turned on until the "off" signal is applied thereto. The ratio of $(\pi-\alpha)$ to $\pi$, that is, the duty factor $$\gamma = \left(1 - \frac{\alpha}{\pi}\right)$$

of the chopper CH is shown by the one-dot chain curve in FIG. 2A. It will be seen in FIG. 2A that the gradient of the one-dot chain curve indicative of the duty factor $\gamma$ of the chopper CH is inverse to that of the solid curve indicative of the duration $\alpha$ of the voltage appearing across the load resistor $R_L$.

Thus, in the range in which the rotation speed of the motor M is low and the induced voltage $E_M$ is low, the magnetomotive force $N_{C3}I_M'$ induced in the control winding $N_{C3}$ by the motor current $I_M'$ fed back from the shunt element SH deviates from the magnetomotive force $N_{C1}I_P$ induced in the control winding $N_{C1}$ by the instruction current $I_P$, as seen in FIG. 2A. The magnetic phase shifter MPS operates at a point P in the phase shift control region, and the duty factor $\gamma$ of the chopper CH has a value corresponding to a point Q. Due to such a variation in the duty factor $\gamma$ of the chopper CH, the motor current $I_M$ is automatically controlled to follow up the instruction current $I_p$.

With the increase in the rotation speed of the motor M, the induced voltage $E_M$ becomes higher correspondingly to increase the duty factor $\gamma$ of the chopper CH so that the motor current $I_M$ can follow up the instruction current $I_p$. Finally, the duty factor $\gamma$ attains 100%, that is, the chopper CH is placed in its full conduction state, and the motor M is now subjected to free acceleration.

As soon as the chopper CH is placed in the full conduction state, the bypass contactor BC connected in parallel with the chopper CH is closed to prevent build-up of heat in the chopper CH. For this purpose, a duty factor level detector $D_{65}$ is provided. This detector $D_\gamma$ detects the duty factor $\gamma$ of the chopper CH on the basis of the terminal voltage of the chopper CH, and an output signal appears therefrom as soon as the duty factor $\gamma$ attains or exceeds a predetermined setting. The output signal from this detector $D_\gamma$ is applied to the base of a first transistor $TR_1$ to turn on the same, and the exciting coil BCC for the bypass contactor BC is energized to close the bypass contactor BC.

In the closed position of the bypass contactor BC, the motor current $I_M$ is given by $$I_M = \frac{V_B - E_M}{R_o},$$

where $V_B$ is the battery voltage, and $R_o$ is the circuit resistance. The value of the motor current $I_M$ given by $$I_M = \frac{V_B - E_M}{R_o}$$

is determined by the value of the induced voltage $E_M$, since the values of $V_B$ and $R_o$ are constant. Suppose that a heavy load is imparted to the motor M operating in such a condition, as when, for example, the battery-driven forklift truck running on level ground with the bypass contactor BC kept in the closed position starts to run a steep ascent or when it enters a sunken spot of ground and tries to move out from this sunken spot. In such a situation, the rotation speed of the motor M decreases to lower the induced voltage $E_M$, and the value of the motor current $I_m$ will become excessively large to such an extent that the motor M will be finally destroyed by burning. It is therefore generally necessary to detect the value of the motor current $I_M$ so as to immediately release the bypass contactor BC in such a situation.

However, for the purpose of detection of such an overcurrent, additional elements such as a shunt, a DC transformer, if required to be insulated from the DC power circuit, and an overcurrent relay are required resulting in an uneconomical control system. Especially in the case of the battery-driven forklift truck or the like for which an inexpensive control system is desired, the additional provision of such extra parts is very undesirable from the economical point of view.

The detection of the motor current value is also required in another case in which the motor control mode is changed over to the field-weakening control so as to increase the rotation speed of the motor M up to a sufficiently high level when the motor current value decreases to less than a limit after the bypass contactor BC has been closed. In such a case too, the problem pointed out hereinbefore is encountered for the detection of the fact that the motor current value has decreased to less than the limit.

The above problem is obviated by the novel and improved arrangement shown in FIG. 1. In the chopper control system shown in FIG. 1, the duty factor level detector $D_\gamma$ generates its output signal as soon as the duty factor $\gamma$ of the chopper CH exceeds a predetermined setting so as to turn on the transistor $TR_1$ at that instant, as described hereinbefore. At the same time, this output signal is applied to a switch element SW to close the same and is applied also to a current instruction signal circuit $RI_p$ so as to increase the value of the instruction current $I_p$. Further, the output voltage of the magnetic phase shifter MPS is applied through the switch element SW to a first voltage level detector $DV_1$, so that, when the level of the output voltage of the magnetic phase shifter MPS is lower than a voltage level setting $V_{L1}$, a second transistor $TR_2$ is turned on to short-circuit the base signal applied to the first transistor $TR_1$.

No output signal appears from the duty factor level detector $D_\gamma$ when the duty factor $\gamma$ of the chopper CH is smaller than the setting, and both the bypass contactor BC and the switch element SW are not closed. In this case, the motor current $I_M$ is controlled to follow up the instruction current $I_p$ supplied from the current instruction signal circuit $RI_p$, which may be electromechanical converter adapted to convert the depression stroke of the accelerator pedal into a corresponding electrical signal when the battery-driven forklift truck is taken as an example. In the current control mode above described, the magnetic phase shifter MPS operates at, for example, a point R in the phase shift control region as shown in (a) of FIG. 3, as in the case of FIG. 2A.

The duty factor level detector $D_\gamma$ generates its output signal as soon as the duty factor $\gamma$ of the chopper CH exceeds the setting. The first transistor $TR_1$ is turned on to close the bypass contactor BC, and the motor current $I_M$ flows now through the bypass contactor BC. In this condition, no voltage appears across the chopper CH, and this is equivalent to the 100% duty factor $\gamma$ of the chopper CH. Therefore, the duty factor level detector $D_\gamma$ continues to generate its output signal. The switch element SW is closed, and the voltage appearing across the load resistor $R_L$ in the magnetic phase shifter MPS is applied to the first voltage level detector $DV_1$.

Figure 3:
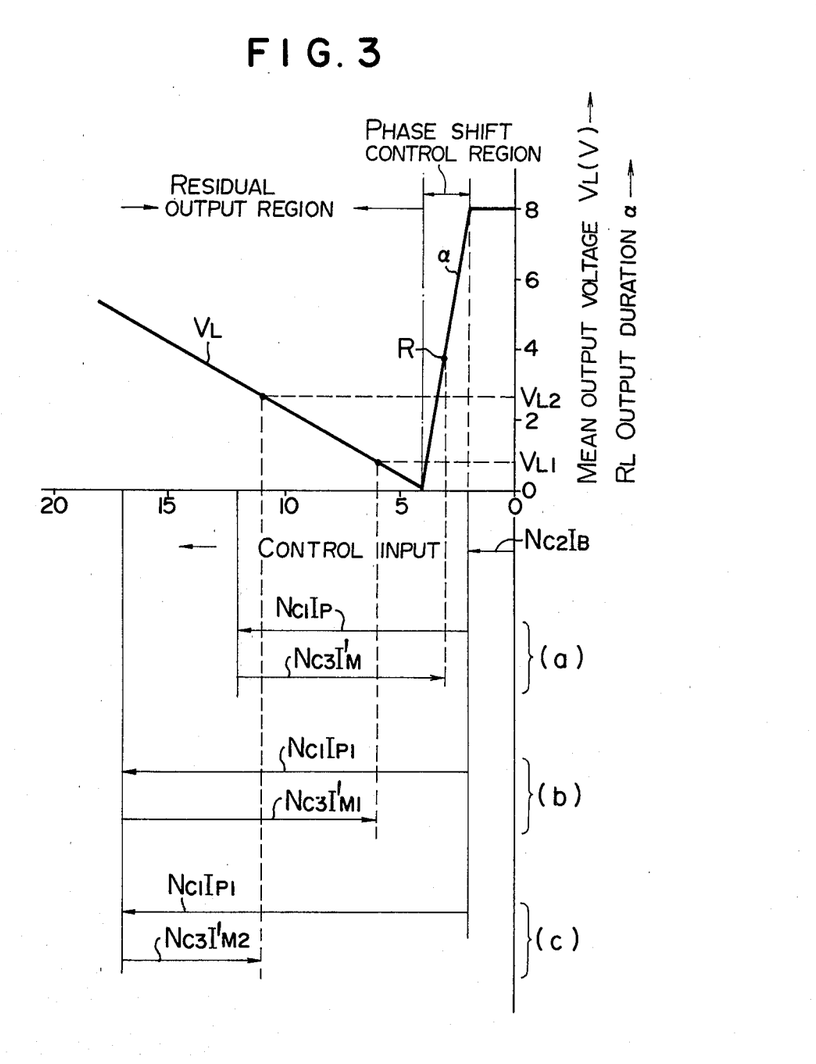
FIG. 3 illustrates also the operation of the magnetic phase shifter cooperating with circuit parts in the chopper control system shown in FIG. 1.

It is known that the output characteristic of the magnetic phase shifter MPS includes a so-called residual output region as shown in FIG. 3 besides the phase shift control region. It is also known that the output voltage $V_L$ of the magnetic phase shifter MPS in this residual output region is proportional to the control input applied to the control winding $N_{C1}$ since the magnetic phase shifter MPS acts as a current transformer in this region. This output voltage $V_L$ is a DC voltage when the control input is a DC signal and the impedance of the control circuit is sufficiently large. FIG. 3 illustrates the numerical value of $V_L$ relative to the control input by way of example.

The overcurrent value $IM_1$ of the motor current $I_M$, at which the bypass contactor BC is to be released, is generally selected to be larger than the value corresponding to the maximum value of the instruction current $I_p$.

The output signal from the duty factor level detector $D_\gamma$ is applied to the current instruction signal circuit $RI_p$ to adjust or increase the value of the instruction current $I_p$. Referring to (b) of FIG. 3, the magnetomotive force $N_{C1}I_{p1}$ induced in the control winding $N_{C1}$ is fixed by selecting the value $I_{p1}$ of the instruction current $I_p$ so that the magnetic phase shifter MPS can operate in the residual output region when the value of the motor current $I_M$ is $I_{M1}$ and the magnetomotive force $N_{C3}I_{M1}'$ is induced in the control winding $N_{C3}$ by the motor current $I_{M1}'$ fed back from the shunt element SH. At the value of the motor current $I_M$ smaller than $I_{M1}$, no base signal is applied to the second transistor $TR_2$, because the level of the output voltage $V_L$ of the magnetic phase shifter MPS is higher than the voltage level setting $V_{L1}$ in the first voltage level detector $DV_1$. With the increase in the value of the motor current $I_M$, the level of the output voltage $V_L$ of the magnetic phase shifter MPS becomes lower until finally it attains the level of the voltage level setting $V_{L1}$. At this instant, the voltage level detector $DV_1$ generates its output signal to turn on the second transistor $TR_2$. The second transistor $TR_2$ thus turned on acts to short-circuit the base signal applied to the first transistor $TR_1$, and the first transistor $TR_1$ is turned off to release the bypass contactor BC.

It will thus be seen that the magnetic phase shifter MPS operates in the residual output region as soon as the bypass contactor BC is closed, and, as soon as the first voltage level detector $DV_1$ detecting the voltage level of $V_L$ across the load resistor $R_L$ in the magnetic phase shifter MPS detects the overcurrent value $I_{M1}$ of the motor current $I_M$, the bypass contactor BC is immediately released so as to prevent burning of the motor M or damage to the gearing It will be understood from the above description that a few inexpensive elements of simple construction such as a switch element SW, a voltage level detector $DV_1$ and a transistor $TR_2$ are merely additionally provided in the output circuit of the magnetic phase shifter MPS so as to detect an excessive increase in the value of the motor current $I_M$ thereby preventing trouble such as burning of the motor M.

The foregoing description is directed to the case in which a DC output voltage $V_L$ lying in the residual output region appears from the magnetic phase shifter MPS. However, there may be a case in which the impedance of the control input circuit cannot be made to be sufficiently large. In such a case, the output voltage $V_L$ appearing across the load resistor $R_L$ will have a waveform including ripples even when a DC control input is applied to the magnetic phase shifter MPS, as is well known in the art. In this case, a smoothing circuit is preferably provided in the input stage of the voltage level detector $DV_1$ so that the operation can be substantially freed from the adverse effect by the ripples.

In the description given with reference to (b) of FIG. 3, the output voltage $V_L$ of the magnetic phase shifter MPS in the residual output region provides the input to the voltage level detector $DV_1$. It is apparent that the output voltage $V_L$ of the magnetic phase shifter MPS in the phase shift control region in FIG. 3 is subjected to the phase shift control in the manner shown in FIG. 2B, and the mean value of the output voltage $V_L$ is also proportional to the control input applied to the control winding $N_{C1}$. Therefore, the voltage level setting $V_{L1}$ of the voltage level detector $DV_1$ may be selected to correspond to the mean value of the output voltage $V_L$ of the magnetic phase shifter MPS in the phase shift control region. That is, the arrangement may be such that the magnetic phase shifter MPS operates in the phase shift control region when the value of the motor current $I_M$ is $I_{M1}$, and the magnetomotive force $N_{C1}I_p$ induced in the control winding $N_{C1}$ by the instruction current $I_p$ supplied from the current instruction signal circuit $RI_p$ is so selected that the mean value of the output voltage $V_L$ of the magnetic phase shifter MPS operating in the phase shift control region is equal to the voltage level setting $V_{L1}$ in the voltage level detector $DV_1$. Such an arrangement is as effective as that described with reference to FIG. 3 in that an excessive increase in the value of the motor current $I_M$ can be easily detected without limiting the operating region of the magnetic phase shifter MPS to the residual output region.

The field-weakening control is also carried out in the chopper control system shown in FIG. 1. For this purpose, a series circuit composed of a field-weakening resistor $R_F$ and a field-weakening contactor FWC is connected in parallel with the field winding F of the DC motor M. A second voltage level detector $DV_2$ having a setting $V_{L2}$ is connected between the switch element SW and the base of third transistor $TR_3$ which, when turned on, acts to energize the exciting coil FWCC for the field-weakening contactor FWC.

As soon as the duty factor $\gamma$ of the chopper CH attains the setting in the duty factor level detector $D_\gamma$, the bypass contactor BC is closed to permit free acceleration of the motor M. In order to increase the rotation speed of the motor M up to a sufficiently high level under the above condition, the field-weakening contactor FWC is closed upon a decrease in the value of the motor current $I_M$ to a predetermined level, thereby shunting the current flowing through the field winding F for the purpose of the field-weakening control. More precisely, when the value of the motor current $I_M$ decreases to a setting $I_{M2}'$ at which the field-weakening control should be carried out, as shown in (c) of FIG. 3, the output voltage $V_L$ of the magnetic phase shifter MPS in the residual output region increases until finally it exceeds a second voltage level setting $V_{L2}$. As soon as the level of the output voltage $V_L$ of the magnetic phase shifter MPS exceeds this voltage level setting $V_{L2}$, an output signal appears from the second voltage level detector $DV_2$ to turn on the third transistor $TR_3$, and the field-weakening contactor FWC is closed to carry out the field-weakening control.

In the field-weakening control described with reference to (c) of FIG. 3, the value of the instruction current $I_p$ supplied from the current instruction signal circuit $RI_p$ is increased up to $I_{p1}$ as soon as the bypass contactor BC is closed, as in the case of the control described with reference to (b) of FIG. 3. It will however be readily understood that the instruction current $I_p$ may be freely selected at any desired value smaller than $I_{p1}$, provided that the magnetic phase shifter MPS operates in the residual output region with the magnetomotive force $N_{C3}I_{M2}'$ induced in its control winding $N_{C3}$ by the motor current $I_{M2}'$ fed back from the shunt SH.

It will be understood from the above description too that a few inexpensive elements of simple construction such as a switch element SW, a voltage level detector $DV_2$ and a transistor $TR_3$ are merely additionally provided in the output circuit of the magnetic phase shifter MPS so as to detect a decrease in the value of the motor current $I_M$ to less than a setting $I_{M2}'$ thereby effectively applying the field-weakening control to the motor M.

Figure 4:
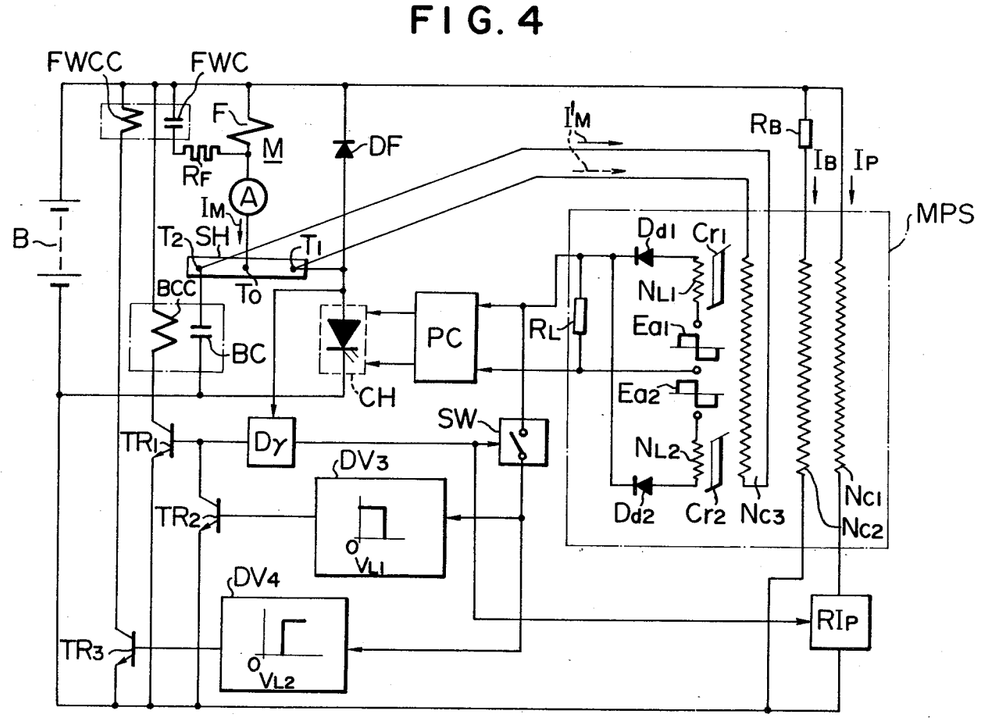
FIG. 4 is an electrical circuit diagram of another preferred embodiment of the chopper control system according to the present invention.

FIG. 4 is an electrical circuit diagram of another embodiment of the chopper control system according to the present invention. In FIG. 4, the same reference numerals are used to designate the same parts appearing in FIG. 1 since the system shown in FIG. 4 is a modification of that shown in FIG. 1.

The embodiment shown in FIG. 4 differs from that shown in FIG. 1 in that the shunt element SH provided for the feedback of the motor current $I_M$ includes three terminals $T_0$, $T_1$ and $T_2$ so that the direction of the feedback current $I_M$, in the closed position of the bypass contactor BC is reverse to that in the chopper control mode.

Referring to FIG. 4, the motor current $I_M$ flows from the terminal $T_0$ toward the terminal $T_1$ of the shunt element SH while the chopper CH is controlling the motor M, and the feedback current $I_M'$ flows in a direction as shown by the solid arrow. The operation is the same as that described with reference to FIG. 1, and the motor current $I_M$ is controlled to follow up the instruction current $I_p$.

Figure 5:
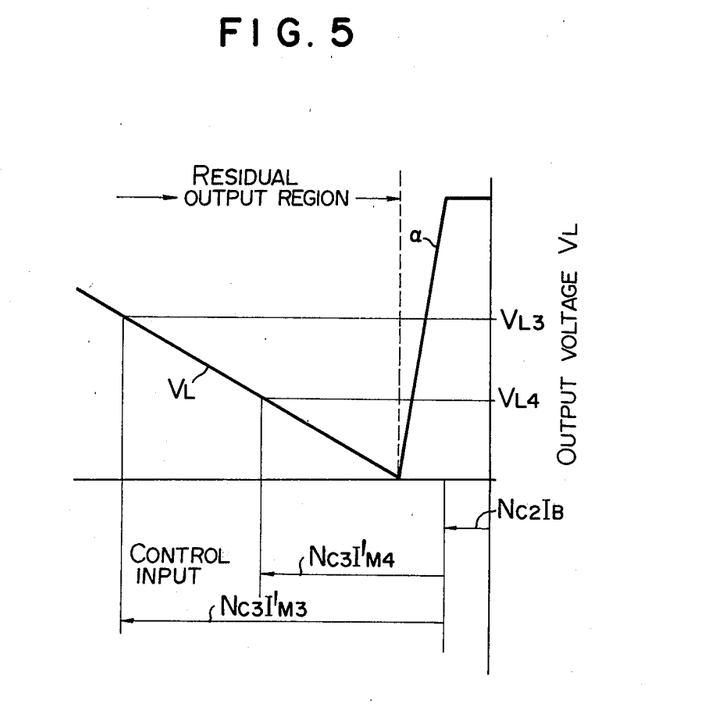
FIG. 5 illustrates the operation of the magnetic phase shifter cooperating with circuit parts in the chopper control system shown in FIG. 4.

On the other hand, when the bypass contactor BC is closed, the motor current $I_M$ flows from the terminal $T_0$ toward the terminal $T_2$ of the shunt element SH, and the feedback current $I_M'$ flows in a direction as shown by the dotted arrow, that is, in the direction opposite to that in the chopper control mode. In response to the appearance of the output signal from the duty factor level detector $D_\gamma$, the switch element SW is closed, and, at the same time, the current instruction signal circuit $RI_p$ is disabled to provide no instruction current $I_p$. Consequently, the bias current $I_B$ and feedback current $I_M'$ supplied to the control windings $N_{C2}$ and $N_{C3}$ of the magnetic phase shifter MPS induce magnetomotive forces $N_{C2}I_B$ and $N_{C3}I_M'$ of the same direction in these control windings $N_{C2}$ and $N_{C3}$ respectively, and the output voltage $V_L$ lying in the residual output region as shown in FIG. 5 appears from the magnetic phase shifter MPS. With the increase in the value of the motor current $I_M$, the output voltage $V_L$ of the magnetic phase shifter MPS becomes higher, and its level attains a first voltage level setting $V_{L3}$ when the value of the feedback current $I_M'$ increases finally up to $I_{M3}'$. At that instant, a first voltage level detector $VD_3$ produces its output signal which turns on the second transistor $TR_2$. When turned on, this transistor $TR_2$ acts to short-circuit the base signal applied to the first transistor $TR_1$ thereby releasing the bypass contactor BC.

On the other hand, when the value of the motor current $I_M$, hence, that of the feedback current $I_M'$ decreases to a current setting $I_{M4}'$ at which the field-weakening control should take place, the level of the output voltage $V_L$ of the magnetic phase shifter MPS is also lowered to a second voltage level setting $V_{L4}$ in a second voltage level detector $DV_4$. The output signal from this second voltage level detector $DV_4$ turns on the third transistor $TR_3$, and the field-weakening contactor FWC is closed to commence the field-weakening control.

This second embodiment is as effective as the first embodiment in that the trouble such as burning of the motor due to an overcurrent can be prevented, and the field-weakening control can also be carried out. According to this second embodiment, the instruction current $I_p$ is unnecessary in the field-weakening control mode.

It will be understood from the foregoing detailed description that the chopper control system according to the present invention can reliably detect the value of the load current by merely additionally providing a few inexpensive elements of simple construction and can thus carry out various modes of control including the release of the bypass contactor or like short-circuit means and the field-weakening control, other than the semiconductor chopper gate control mode.

What we claim is:

1. A chopper control system including a battery, a DC series motor for driving an electric vehicle, a shunt resistor, a thyristor chopper, said DC series motor, said shunt resistor and said thyristor chopper being connected in series with said battery, a magnetic phase shifter including a first control winding receiving a current instruction signal instructing the motor current of said motor and a second control winding connected across said shunt resistor for carrying out the gate control of said thyristor chopper, and a first contactor acting to short-circuit said thyristor chopper in response to the attainment of the duty factor of said thyristor chopper at a predetermined setting, said chopper control system comprising means for fixing said current instruction signal at a predetermined level while said thyristor chopper is short-circuited by said first contactor, means for releasing said first contactor in response to the detection of the fact that the value of the motor current represented by the level of the output from said magnetic phase shifter exceeds a first predetermined setting while said fixing means is in operation, and a second contactor for connecting a resistor in parallel with the field winding of said DC series motor in response to the detection of the fact that the value of the motor current represented by the level of the output from said magnetic phase shifter decreases to less than a second predetermined setting while said fixing means is in operation.

2. A chopper control system for use with a DC motor having a series field winding and connected in series with a shunt resistor, a thyristor chopper and a DC power source; a magnetic phase shifter having a first control winding connected to receive a current command signal for controlling a motor current supplied to said DC motor from the DC power source, a second control winding connected to said shunt resistor to receive a motor current signal indicative of the actual motor current and output means for producing an output signal as a function of the difference between said current command signal and said motor current signal and applying said output signal to said thyristor chopper for controlling its duty; and means responsive to the duty of said chopper exceeding a predetermined value for short-circuiting said chopper; said chopper control system comprising:

means for fixing said current command signal at a predetermined value when said chopper short-circuiting means operates; and means, responsive to said current command signal being fixed and the output signal of said magnetic phase shifter being reduced below a predetermined value, for partially shunting a series field current flowing through the series field winding of said DC motor.

3. A chopper control system according to claim 2, wherein said current command signal is fixed at a value which is effective to operate said magnetic phase shifter in its residual output region.

4. A chopper control system according to claim 2, wherein said shunt resistor is provided with two end terminals connected across said second control winding of said magnetic phase shifter and also connected, respectively, to said chopper and said chopper short-circuiting means, and an intermediate terminal connected to said D.C. motor.

5. A chopper control system according to claim 4, wherein said current command signal is fixed at a value representing the motor current being zero.

6. A chopper control system according to claim 2, further comprising means responsive to said current command signal being fixed and the output signal of said magnetic phase shifter exceeding a second predetermined value, for making said chopper short-circuiting means inoperative.

* * * * *